United States Patent
Mankovitz

[15] 3,691,426
[45] Sept. 12, 1972

[54] CURRENT LIMITER RESPONSIVE TO CURRENT FLOW AND TEMPERATURE RISE

[72] Inventor: Roy J. Mankovitz, Tarzana, Calif.
[73] Assignee: Teledyne, Inc., Los Angeles, Calif.
[22] Filed: Oct. 26, 1971
[21] Appl. No.: 192,232

[52] U.S. Cl. ............317/23, 317/33 VR, 317/40 R, 317/54, 323/4, 323/9, 323/68
[51] Int. Cl. .......................H02h 3/08, H02h 5/04
[58] Field of Search............317/23, 33 VR, 40 R, 54; 323/4, 9, 68

[56] References Cited

UNITED STATES PATENTS

| | | | |
|---|---|---|---|
| 3,048,718 | 8/1962 | Starzec et al. | 317/33 VR |
| 3,303,386 | 2/1967 | Murphy | 317/33 VR |
| 3,566,200 | 2/1971 | Seidler | 317/40 R |
| 3,579,039 | 5/1971 | Damon | 323/9 X |
| 3,641,423 | 2/1972 | Stauffer | 323/9 |
| 3,654,518 | 4/1972 | Phelps et al. | 317/54 X |

Primary Examiner—A. D. Pellinen
Attorney—Ronald W. Reagin et al.

[57] ABSTRACT

A current limiting circuit for controlling the flow of current in which a primary current conducting path includes the emitter-collector circuit of a power transistor. A driver transistor provides base current to the power transistor, thereby controlling the magnitude of current flow through the power transistor. A constant current is applied to the base electrode of the driver transistor. Shunt means are provided which are responsive to the magnitude of current flowing in the power transistor for shunting a portion of the constant current away from the base electrode of the driver transistor whenever the magnitude of the current in the power transistor exceeds a predetermined value, thereby diminishing the output current from the driver transistor and thus the base current in the power transistor.

10 Claims, 1 Drawing Figure

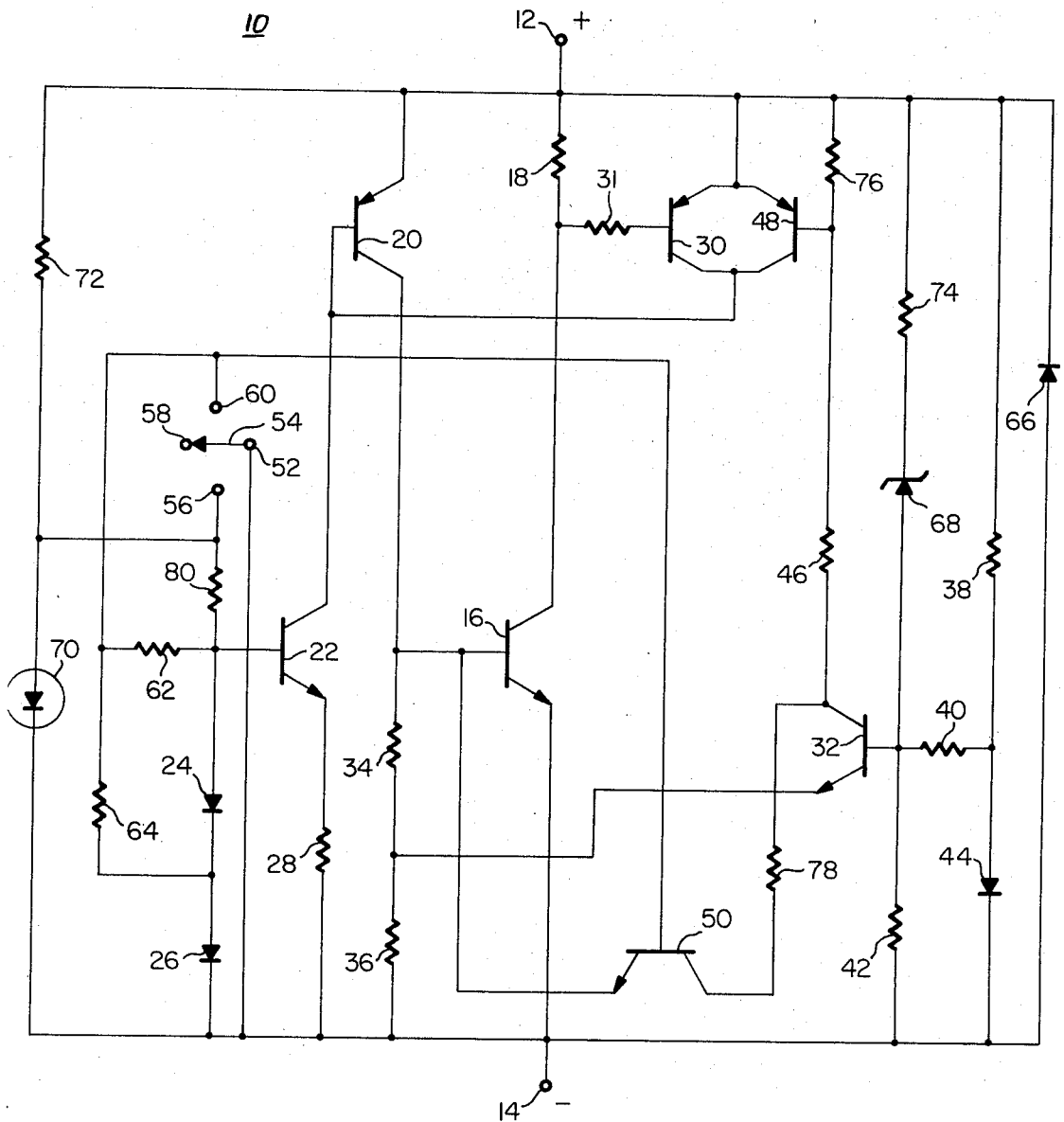
ROY J. MANKOVITZ
INVENTOR
BY *Ronald W Reagan*
ATTORNEY

CURRENT LIMITER RESPONSIVE TO CURRENT FLOW AND TEMPERATURE RISE

The present invention relates to current limiting circuits, and more particularly to a solid state current limiting circuit which limits the current flowing therethrough, which automatically trips or stops all current flow therethrough if the temperature of the circuit exceeds a predetermined value, and which is capable of either automatic or manual resetting after tripping.

Conventional mechanical circuit breakers of either the thermal or magnetic type suffer from many drawbacks. For example, during a short circuit, it is usually several hundred milliseconds before the breaker finally trips and opens its contact. During this time it is possible for thousands of amps to flow. This effectively short-circuits the power supply, thereby presenting the possibility of fire from burning insulation of wires and also permanent damage to the power supply and to the load. When the breaker does finally open, a large arc is present at the contacts, which arc must be dissipated within the circuit breaker, thereby severely limiting the life of the circuit breaker. Also, because of this large arc, such circuit breakers cannot be used in an explosive atmosphere.

All of the above disadvantages are well known to those skilled in the art. To overcome these advantages, numerous attempts have been made to provide solid state circuits using power transistors to control the flow of current in a circuit. Such circuits may be termed circuit breakers, since they are functionally interchangeable with the mechanical circuit breakers of the prior art.

The present invention is directed to this type of device. Accordingly, the invention might be termed a solid state circuit breaker circuit, since it has all of the functional advantages of the prior art circuit breakers, whether of the mechanical type or solid state circuit type. Thus, the circuit of the invention functions to prevent short circuits and overloads from drawing excessive currents and damaging either the power supply or the load. Further, like the solid state circuit breaker circuits of the past, no mechanical contacts are used. Instead, current flow is controlled by controlling the conductivity of a power transistor. Thus, there is no danger of arcing when the invention functions to interrupt current flow. Further, the circuit can easily be controlled and reset from a remote location and does not have to be reset at its actual location.

However, unlike many of the solid state circuit breaker circuits of the prior art, the circuit of the present invention does more than merely interrupt current flow, thereby totally disabling the load if an excessive current is sensed. Instead, the circuit senses the magnitude of the current flowing in the circuit and limits it to a predetermined value instead of disabling the circuit altogether. This current limiting function continues until the temperature of the power transistor becomes excessive, at which time current flow in the circuit is extinguished altogether. Thus, strictly speaking, the circuit of the present invention is better described as a current limiting circuit instead of as a circuit breaker.

It is accordingly an object of the present invention to provide an improved current limiting circuit.

It is another object of the present invention to provide an improved current limiting circuit which limits the current flowing therethrough to a predetermined value but which does not extinguish current flow altogether if the current attempts to exceed this value.

Briefly stated, and in accordance with the presently preferred embodiment of the invention, a current limiting circuit for controlling the flow of current therethrough is provided which includes a primary current conducting path between its input and output terminal. This primary current conducting path includes the emitter-collector circuit of a power transistor. A driver transistor is provided which provides base current to the power transistor, thereby controlling the magnitude of current flow through the power transistor. A constant current circuit is provided whose output current is applied to the base electrode of the driver transistor. Shunt means are provided which are responsive to the magnitude of current flowing in the power transistor for shunting a portion of the current flowing from the constant current circuit away from the base electrode of the driver transistor whenever the magnitude of the current in the power transistor exceeds a predetermined value, thereby diminishing the output current from the driver transistor and thus the base current in the power transistor. Thus, the current flowing in the power transistor is prevented from exceeding this predetermined value.

For a complete understanding of the invention, and an appreciation of its other objects and advantages, please refer to the following detailed description of the attached drawing, in which the sole FIGURE shows a schematic representation of a current limiting circuit in accordance with the present invention.

The current limiting circuit 10 includes terminals 12 and 14 which are connected in series with a power supply and a load to which current is to be supplied. Neither the power supply nor the load are shown in the drawing. The terminal 12 may arbitrarily be designated the input terminal and the terminal 14 may arbitrarily be designated the output terminal, since, in the conventional sense, dc current flows in the circuit from terminal 12 to terminal 14, as is shown by the polarity symbols by these terminals.

Connected in series between the terminals 12 and 14 is a primary current conducting path comprising the emitter-collector circuit of a power transistor 16 and a resistance 18. The current being regulated flows through this primary current conducting path. Current flowing in other portions of the circuit is quite low, and substantially all of the current flow between input terminal 12 and output terminal 14 may be considered to flow through this primary current conducting path. Accordingly, the value of the resistance 18 is quite small, such as 0.1 ohm, since it is desired to have as small a voltage drop as possible between the terminals 12 and 14. Typically, if the circuit 10 is designed to control current flow through the primary current conducting path to 5 amps or less, the voltage drop between the terminals 12 and 14 might be 750 millivolts.

Current flowing in the primary current conducting path is controlled by the level of conductivity of power transistor 16, which thus might be termed the primary control transistor in the circuit. The conductivity of transistor 16 in turned is controlled by the level of its base current, which is provided by driver transistor 20. As is shown in the drawing, the collector electrode of driver transistor 20 is connected directly to the base electrode of primary control transistor 16. The level of the collector current of driver transistor 20 is in turn controlled by the base current of driver transistor 20. This base current of driver transistor 20 is provided by a constant current circuit comprising the transistor 22, the diodes 24 and 26 and the resistance 28. Those skilled in the art are familiar with this type of constant current circuit. The collector current flowing in transistor 22 is constant, with its magnitude determined by the forward voltage drop across the diodes 24 and 26 and the magnitude of the emitter resistance 28. Accordingly, the operation of the constant current circuit is not further described.

As is shown in the drawing, the collector of transistor 22 is directly connected to the base of driver transistor 20.

In normal operation, when the level of current flowing in the primary current conducting path is less than a predetermined value to which the current is to be limited, that portion of the circuit just described is all that is operating. At this time, the constant current output in the collector of transistor 22 is causing the driver transistor 20 to be saturated, and driver transistor 20 in turn is supplying sufficient base current to primary control transistor 16 to also cause this transistor to be saturated. Accordingly, the magnitude of the current flowing between terminals 12 and 14 is a function of the voltage output of the power supply and the impedance of the load.

However, if because of malfunction in either the power supply or the load, or for any other reason, the current in the primary current conducting path attempts to exceed the predetermined rated value of the current limiting circuit 10, the current flowing therethrough is maintained at this rated value in the following manner: A first shunting transistor 30, which may be termed the current control transistor in the circuit, is provided which is connected as shown with its emitter-collector circuit connected between the base electrode and the emitter electrode of driver transistor 20. The base electrode of current control transistor 30 is connected through resistance 31 to the resistance 18 in the primary current conducting path. The magnitude of resistance 31 is chosen such that if the current flowing through resistance 18 is less than the rated current level of the circuit 10, transistor 30 is biased off. However, if the current flowing through resistance 18 attempts to exceed this rated current level, transistor 30 is biased into conduction, and thus its emitter-collector circuit begins shunting a portion of the constant current in the collector circuit of transistor 22 away from the base electrode of driver transistor 20. As this occurs, the collector current of driver transistor 20 is reduced, thereby reducing the base current of primary control transistor 16. When this occurs, the apparent impedance between the collector and emitter electrodes of primary control transistor 16 increases, and the current flowing in the primary current conducting path between input terminal 12 and output terminal 14 is maintained constant.

Of course, as this occurs, an increased potential drop occurs across primary control transistor 16, since it is no longer in saturation, and primary control transistor 16 may begin to heat up as current flows through the transistor while it is presenting a substantial impedance. If the temperature of primary control transistor reaches too high a level, it may be completely destroyed. To prevent this, a temperature sensitive transistor 32 is provided which is in intimate thermal contact with the primary control transistor 16. Essentially all transistors are temperature sensitive, in the sense that with increasing temperature, a lower bias voltage between the base electrode and emitter electrode is required to trigger the transistor into conduction, and conversely at lower temperatures a higher bias voltage is required. For example, a typical transistor might have a fairly constant temperature-turn-on gradient of approximately −2 millivolts per °C. Thus, transistor 32 is referred to as a temperature sensitive transistor to indicate its function and to provide it with a proper antecedent for later description of the circuit, rather than to indicate that it is different in its operating characteristics from conventional transistors.

Temperature sensitive transistor 32 is biased so that it is normally biased off or non-conductive, but that at some predetermined temperature value above ambient temperature, it becomes conductive. This bias is provided by connecting its emitter electrode to the voltage divider formed by the resistances 34 and 36 and by connecting its base electrode to the voltage divider formed by the resistances 38, 40 and 42 and by the forward voltage drop across the diode 44. These networks together provide an emitter-base bias voltage on temperature sensitive transistor 32 which is equal to the algebraic sum of the voltage drops across resistance 36 and resistance 42. It is noted that, for reasons described below, these voltage drops are of opposite polarity.

In a typical application, the voltage drop across resistance 36 might be 90 millivolts and the voltage drop across resistance 42 might be 240 millivolts, thereby providing a net positive bias between the emitter and base electrodes of temperature sensitive transistor 32 of 150 millivolts. The magnitude of this bias voltage is, by design, insufficient to bias temperature sensitive transistor 32 into conduction at ambient temperature, which might be 20°C. For example, transistor 32 might require an additional bias of 150 millivolts before it begins conduction. Then, if transistor 32 has the aforementioned temperature-turn-off gradient of −2 millivolts per °C., transistor 32 becomes conductive when the temperature of primary control transistor 16, and thus of temperature sensitive transistor 32, becomes 75° C. higher than ambient. This conductivity causes current to flow through a resistance 46 to the base electrode of a second shunting transistor 48 whose emitter and collector electrodes are also connected between the base and emitter electrodes of driver transistor 20. Again, shunting transistor 48, which may be termed the temperature control transistor, is biased so that it is normally non-conductive unless temperature sensitive transistor becomes conductive. When this occurs, second shunting transistor 48 also becomes conductive, and begins shunting even more of the constant current in the collector circuit of transistor 22 away from the base electrode of driver transistor 20. As this occurs, the collector current level from driver transistor 20 drops even further, and primary control transistor 16 becomes even less conductive. This in turn causes the voltage drop across the voltage divider network formed by the resistances 34 and 36 to decrease, thereby reducing the voltage on the emitter of temperature sensitive transistor 32, and driving this transistor further into conduction. Thus, a positive feedback loop is completed which causes the second shunting transistor 48 to be driven into saturation almost instantaneously when temperature sensitive transistor 32 begins conducting. When second shunting transistor 48 is saturated, it diverts essentially all of the constant current in the collector circuit of transistor 22 away from the base electrode of driver transistor 20. At this time, primary control transistor 16 is completely turned off and essentially all current flow between the input terminal 12 and output terminal 14 is terminated.

When this occurs, the 90 millivolt voltage drop across resistance 36 is eliminated. As was noted above, the polarity of this voltage drop was such as to bias transistor 32 further off. With this bias eliminated, transistor 32 is now biased 90 millivolts above its conduction level, and continues conducting until its temperature drops 45°C., or to a temperature 30°C., above ambient, at which time, because of its temperature-turn off gradient, it is again biased non-conductive. Thus, temperature control transistor 48 continues to keep primary control transistor 16 from conducting until it cools down to a second predetermined temperature lower than the first predetermined temperature which initially caused the transistor 16 to be turned of.

A latching transistor 50 and a switch 52 are provided which enable the circuit 10 to remain off or non-conductive for an indefinite period after the temperature of primary control transistor 16 exceeds the predetermined value, until the circuit 10 is manually reset, rather than having the circuit 10 automatically become conductive again when the temperature decreases to the above mentioned second predetermined temperature level.

Switch 52 includes a movable contact 54, a "off" terminal 56, a "manual" terminal 58 and a "automatic" terminal 60. As is shown, the emitter electrode of latching transistor 50 is connected directly to the base electrode of primary control transistor 16, and is thus biased by the voltage drop across the above described voltage divider network formed by the resistances 34 and 36. The base electrode of latching transistor 50 is connected to the "automatic" terminal 60 of switch 52 and also to the junction of the voltage dividing network formed by the resistances 62 and 64 which are in parallel with the diode 24 in the constant current circuit described above. Thus, the junction of these resistances is a point of constant potential reference. The magnitudes of the resistances 62 and 64 are chosen such that the voltage at this point effectively biases the base of latching transistor 50 into a non-conductive state when driver transistor 20 is conducting and when the switch 52 is in the manual position as shown. However, when the temperature of primary control transistor 16 exceeds its predetermined maximum and second shunting transistor 48 effectively quenches driver transistor 20, there is then usually no voltage drop across the resistances 34 and 36 and the bias voltage on the base of latching transistor 50 now triggers this transistor into conduction. When this occurs, latching transistor 50 maintains second shunting transistor 48 in its saturated state, even though temperature sensitive triggers 32 may subsequently become non-conductive when the temperature of primary control transistor 16 drops below the above described second or lower predetermined temperature level. The circuit 10 thus remains nonconductive and continues in this state until the switch 52 is manually reset by moving the movable contact 54 to the "automatic" terminal 60. When this occurs, the bias voltage is removed from the base of latching transistor 50, second shunting transistor 48 is quenched or rendered non-conductive and the constant current output from transistor 22 is again applied to the base of driver transistor 20, which in turn triggers primary control transistor 16 into saturation, thereby once again establishing a low impedance current path between the input and output terminals 12 and 14. It is noted that if the switch 52 is left in the "automatic" position, latching transistor 50 is effectively removed from the circuit, and conduction is automatically restored at the second predetermined temperature level in the manner described above. It is also noted that if the movable contact 54 of switch 52 is placed in contact with the "off" terminal 56, base current is removed from the transistor 22, and the entire circuit 10 is disabled.

Several other ancillary features of the invention are shown in the drawing. For example, a diode 66 is provided which has its cathode connected to input terminal 12 and its anode connected to output terminal 14 as shown. This protects the circuit 10 from inverse voltages which might for any reason occur. Also, a Zener diode 68 is provided to protect the circuit 10 from abnormally high voltage spikes of a positive polarity. If such an abnormally high positive voltage is applied to input terminal 12, Zener diode 68 merely breaks down, in the manner well known to those skilled in the art, and immediately triggers temperature sensitive transistor 32 into conduction, regardless of the temperature of the circuit 10 at this time. Now, because of the positive feedback loop described above, second shunting transistor 48 is essentially instantaneously triggered into saturation, and conduction through primary control transistor 16 is terminated essentially instantly, in the manner described above. As soon as this excessive voltage disappears, Zener diodes 68 returns to its normally non-conductive state, transistor 32, and thus transistor 48, is quenched, and primary control transistor 16 again begins conducting current in a normal manner.

A light emitting diode 70 of a conventional nature is also provided to provide a visual indication that the circuit is either attempting to draw too much current, but is being prevented from doing so by the first shunting or current limiting transistor 30 or that the temperature of the circuit 10 has increased to a point that the second shunting or temperature control transistor 48 has completely extinguished conduction through primary transistor 16. Depending upon the value selected for resistance 72 and upon the selected characteristics of light emitting diode 70, the diode 70 may begin emitting light, thus providing the necessary visual indication, either when a voltage build-up first begins occurring between the terminals 12 and 14, thereby indicating that the primary control transistor is gradually being biased into a relatively high impedance state, or diode 70 may begin emitting light only when primary control transistor 16 ceases conducting entirely, and essentially the entire voltage from the power supply appears between the terminals 12 and 14.

While the invention is thus shown and presently preferred embodiment described in detail, it is not intended that the invention be limited to this shown embodiment. Instead, many modifications will occur to those skilled in the art which lie within the spirit and scope of the invention. It is thus intended that the invention be limited in scope only by the appended claims.

What is claimed is:

1. A current limiting circuit for controlling the flow of current between an input terminal and an output terminal comprising, in combination:
   a primary current conducting path between said input terminal and said output terminal, said path including a primary control transistor having an emitter, a collector and a base electrode, with the emitter and collector electrodes of said primary control transistor being connected in series between said input terminal and said output terminal;
   a driver transistor having a control electrode, an input electrode and an output electrode;
   means connecting the output electrode of said driver transistor to the base electrode of said primary control transistor;
   a constant current circuit including an output terminal through which a constant current flows;
   means connecting said output terminal of said constant current circuit to the control electrode of said driver transistor; and
   shunt means responsive to primary current flowing in said primary current conducting path for shunting a portion of the current flowing in said constant current circuit away from the control electrode of said driver transistor whenever the magnitude of said primary current exceeds a predetermined value, whereby the current flowing between the output electrode of said driver transistor and the base electrode of said primary control transistor is reduced and said primary current is prevented from exceeding said predetermined value.

2. The invention of claim 1 in which said primary current conducting path further includes a resistance connected in series between said primary control transistor and one of said input and output terminals and in which said shunt means includes means responsive to the voltage drop across said resistance for shunting a portion of said current flowing in said constant current circuit away from the control electrode of said driver transistor.

3. The invention of claim 2 in which said shunt means comprises a transistor having its emitter and collector electrodes connected between the input and control electrodes of said driver transistor and having its base electrode connected to said resistance.

4. The invention of claim 3 in which said primary control transistor and said driver transistor are of opposite conductivity.

5. The invention of claim 1 in which said shunt means further comprises means responsive to the temperature of said primary control transistor for shunting substantially all of the current flowing in said constant current circuit away from the control electrode of said driver transistor whenever said temperature exceeds a predetermined value, whereby the current flowing between the output electrode of said driver transistor and the base electrode of said primary control transistor is substantially eliminated and no current flows in said primary current conducting path.

6. The invention of claim 5 in which said primary current conducting path further includes a resistance connected in series between said primary control transistor and one of said input and output terminals, and in which said shunt means comprises:
   a first current control transistor having its emitter and collector electrodes connected between the input and control electrodes of said driver transistor and having its base electrode connected to said resistance;
   a second temperature control transistor having its emitter and collector electrodes connected between the input and control electrodes of said driver transistor; and
   temperature sensing means responsive to the temperature of said primary control transistor for driving said second transistor into saturation whenever said temperature exceeds a predetermined value.

7. The invention of claim 6 in which said temperature sensing means comprises a temperature sensitive transistor in thermal contact with said primary control transistor, means connecting an output electrode of said temperature sensitive transistor to the base electrode of said second transistor and positive feedback means for driving said temperature sensitive transistor further into conduction whenever said temperature sensitive transistor begins conducting.

8. The invention of claim 7 in which said temperature sensing means further comprises control means for triggering said temperature sensitive transistor into conduction whenever its temperature exceeds a first predetermined temperature and for maintaining said temperature sensitive transistor conductive until its temperature drops below a second predetermined temperature lower than said first temperature.

9. The invention of claim 8 in which said control means comprises means for biasing the base electrode of said temperature sensitive transistor to a predetermined potential and means for biasing the emitter electrode of said temperature sensitive transistor to a first predetermined level when said temperature sensitive transistor is not conducting and to a second predetermined level lower than said first level when said temperature sensitive transistor is conducting.

10. The invention of claim 9 which further comprises a latching transistor, means for triggering said latching transistor into conduction whenever said temperature sensitive transistor is conducting, means connecting said latching transistor to said second transistor to maintain said second transistor in saturation whenever said latching transistor is conducting, and switch means for selectively connecting said latching transistor in and out of said current limiting circuit.

* * * * *